United States Patent
Shoji et al.

(10) Patent No.: US 7,352,315 B2
(45) Date of Patent: Apr. 1, 2008

(54) ANALOG SIGNAL GENERATOR AND DIGITAL CIRCUIT DRIVER, AND IMAGING APPARATUS

(75) Inventors: Takaaki Shoji, Saitama (JP); Tomoyuki Kenmotsu, Kanagawa (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/459,517

(22) Filed: Jul. 24, 2006

(65) Prior Publication Data
US 2007/0018875 A1    Jan. 25, 2007

(30) Foreign Application Priority Data
Jul. 25, 2005    (JP) .............................. 2005-213878

(51) Int. Cl.
*H03M 1/12*    (2006.01)
*G11C 7/00*    (2006.01)

(52) U.S. Cl. ..................... 341/155; 365/222; 348/207

(58) Field of Classification Search ................ 341/155; 365/222, 185.25; 348/207, 294
See application file for complete search history.

(56) References Cited

U.S. PATENT DOCUMENTS 5,146,430 A * 9/1992 Torimaru et al. ........... 365/222
6,680,498 B2 * 1/2004 Guidash ..................... 257/222
6,903,670 B1 * 6/2005 Lee et al. ................... 341/118
7,085,881 B2 * 8/2006 Tsuchida et al. ............ 711/106
7,180,816 B2 * 2/2007 Park ...................... 365/230.03
7,215,589 B2 * 5/2007 Dono et al. ................. 365/222

FOREIGN PATENT DOCUMENTS

JP    2002-218373    8/2002

* cited by examiner

*Primary Examiner*—Peguy JeanPierre
(74) *Attorney, Agent, or Firm*—Greenblum & Bernstein, P.L.C.

(57) ABSTRACT

An analog signal generator and digital circuit driver comprises an analog signal generator driving block and a digital circuit driving block. The analog signal generator and digital circuit driver is connected to an analog signal generator and to a digital circuit separately. The analog signal generator generates an analog signal. Noise is generated at the digital circuit during a first operation. The analog signal generator driving block outputs a first driving signal to the analog signal generator. The first driving signal causes the analog signal generator to generate the analog signal. The digital circuit driving block causes the digital circuit to carry out the first operation between two first driving signals, consecutively output from the analog signal generator driving block at different timings.

6 Claims, 6 Drawing Sheets

ANALOG SIGNAL GENERATOR AND DIGITAL CIRCUIT DRIVER, AND IMAGING APPARATUS

BACKGROUND OF THE INVENTION

1. Field of the Invention

The present invention relates to an analog signal generator and digital circuit driver, which drives an analog signal generator and a digital circuit housed in a same apparatus together.

2. Description of the Related Art

A digital camera in the prior art generates an image signal, which is analog signal, according to a pictured image, converts the image signal to a digital signal, and then carries out some predetermined signal processing for the image signal. The digital camera comprises an imaging device, an A/D converter, a timing generator, a frame memory, and other components in order to perform such operations. These analog circuits and digital circuits are housed in the digital camera. Accordingly, an attendant problem is that noise generated by a digital circuit is mixed in an analog signal.

For example, the method of utilizing a DRAM as a frame memory of a digital camera is already known. The DRAM, which is digital circuit, requires a refresh operation for rewriting the data. But, it is possible that noise may be generated by the refresh operations and that the noise may be mixed with the image signal.

As in the above example, it is possible that noise generated by driving a digital circuit may be mixed with an analog signal flowing on an analog circuit housed in an apparatus with the digital circuit

SUMMARY OF THE INVENTION

Therefore, an object of the present invention is to provide an analog circuit driver that prevents noise, generated by driving a digital circuit, from mixing with an analog signal.

According to the present invention, an analog signal generator and digital circuit driver comprises an analog signal generator driving block and a digital circuit driving block. The analog signal generator and digital circuit driver is connected to an analog signal generator and to a digital circuit separately. The analog signal generator generates an analog signal. Noise is generated at the digital circuit during a first operation. The analog signal generator driving block outputs a first driving signal to the analog signal generator. The first driving signal causes the analog signal generator to generate the analog signal. The digital circuit driving block causes the digital circuit to carry out the first operation between two first driving signals consecutively output from the analog signal generator driving block at different timing.

Further, preferably, the analog signal generator is an imaging device. The imaging device generates an image signal based on the first driving signal. The image signal is an analog signal.

Further, preferably, the digital circuit is a DRAM. The DRAM stores the image signal that is converted to a digital signal by an A/D converter. The first operation is a refresh operation of the DRAM.

Further, preferably, the digital circuit driving block carries out the refresh operation of the DR based on the first driving signal.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
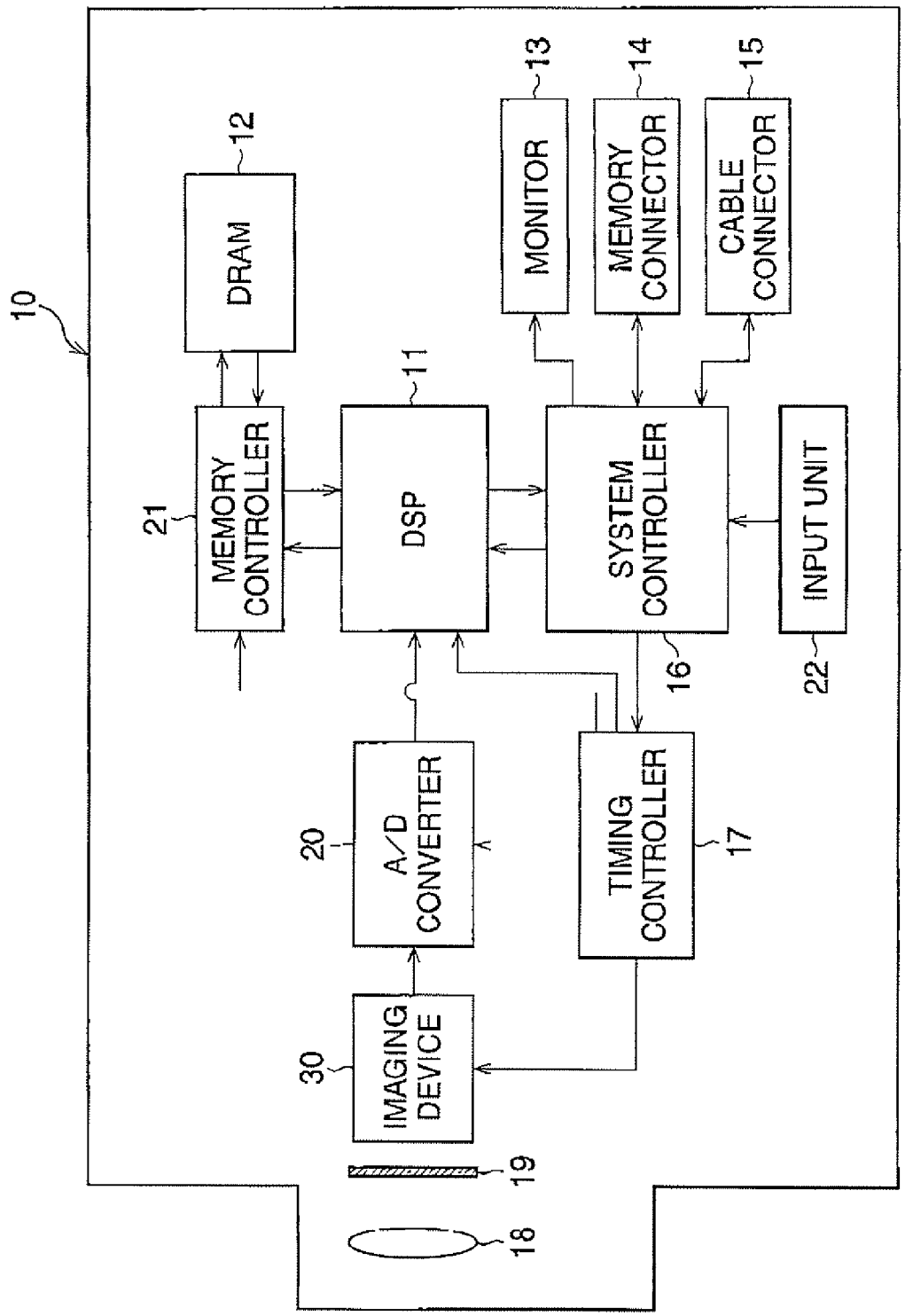
FIG. 1 schematically illustrates an internal structure of a digital camera having a digital camera driving system of the first embodiment.

The present invention is described below with reference to the embodiments shown in the drawings.

First, an outline of the digital camera 10 is explained.

As shown in FIG. 1, a digital camera 10 comprises an imaging device 30, an A/D converter 20, a memory controller 21, a digital signal processor (DSP) 11, a DRAM 12, a monitor 13, a memory connector 14, a cable connector 15, a system controller 16, a timing controller 17, and other components.

The imaging device 30 is connected to the DSP 11 through the A/D converter 20 described hereinafter. An image signal, which the imaging device 30 generates in the photographing operation, is sent to the DSP 11. The image signal, which is sent to the DSP 11, is stored by the DRAM 12, which is a work memory for signal processing, through a memory controller 21 described hereinafter. The DSP 11 carries out some predetermined signal processing for the image signal stored by the DRAM 12.

The image signal, having undergone the signal processing in the DSP 11, is sent to the monitor 13. The image corresponding to the image signal is displayed on the monitor 13. Alternatively the image signal, having undergone the signal processing in the DSP 11, is sent to an external memory (not depicted) connected to the memory connector 14. Alternatively the image signal, having undergone the signal processing in the DSP 11, is sent to a personal computer (not depicted) or to a printer (not depicted) connected to the cable connector 15. The personal computer carries out some signal processing for the image signal. The printer prints out a picture based on the image signal.

The system controller 16 controls all the operations of the digital camera 10. The system controller 16 is connected to an input unit 22, comprising a shutter button (not depicted), a mode-change switch (not depicted), and other input devices. A user can carry out the input operation for the release movements or the mode change with the input unit 22.

The timing controller 17 is controlled by the system controller 16. Based on the control, the timing controller 17 outputs an imaging device drive signal for driving the imaging device 30, and a memory control signal for storing the image signal in the DRAM 12, at predetermined timings, respectively.

Next, each component of the digital camera 10 is explained below.

A photographic optical system 16 is mounted in the digital camera 10. The photographic optical system 18 comprises some lenses, and the lenses enable a focal length to adjust to a required level or an optical image to be in focus on the light receiving surface of the imaging device 30. The photographic optical system 1B is optically connected to the imaging device 30.

A shutter 19 is mounted between the photographic optical system 18 and the imaging device 30. The shutter 19 opens in the photographing operation. Then, an optical image of an object reaches the receiving surface of the imaging device 30 and is received there. The imaging device 30 generates an image signal corresponding to the received image.

Figure 2:
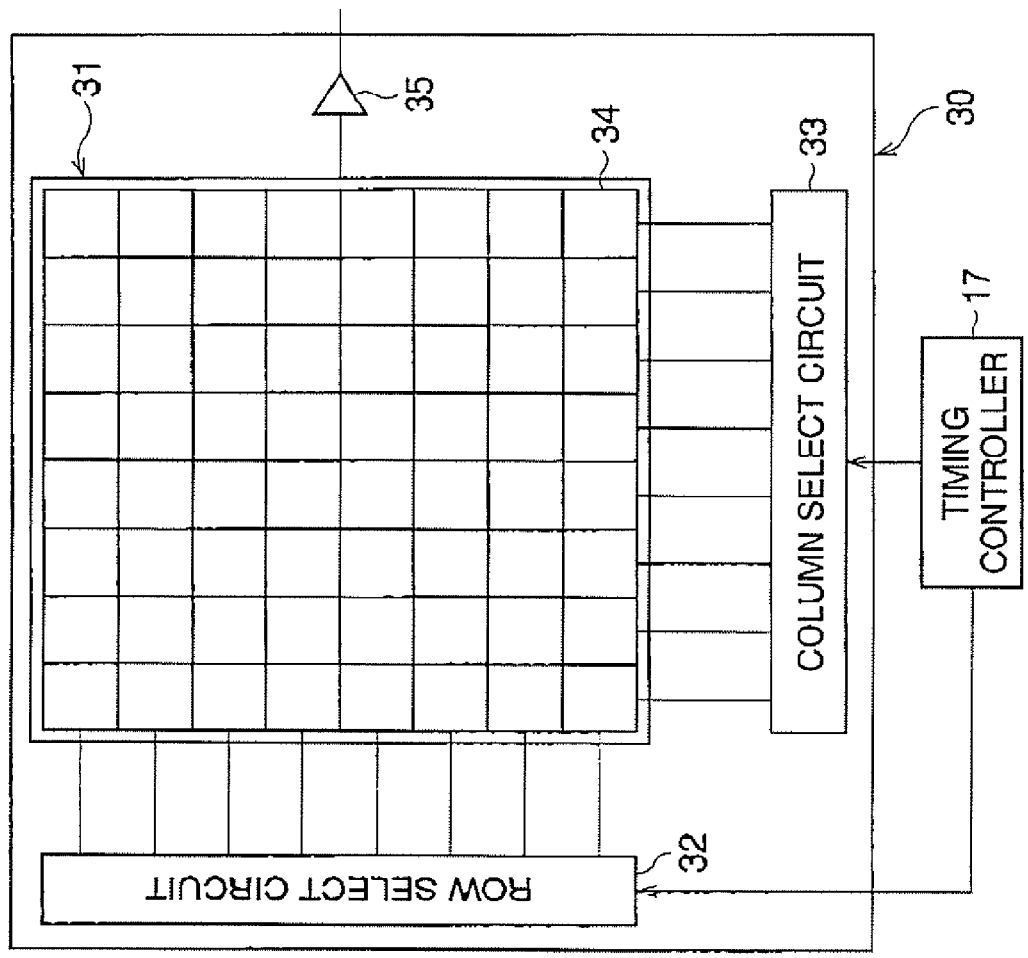
FIG. 2 is a block diagram illustrating the electrical structure of the imaging device.
Figure 3:
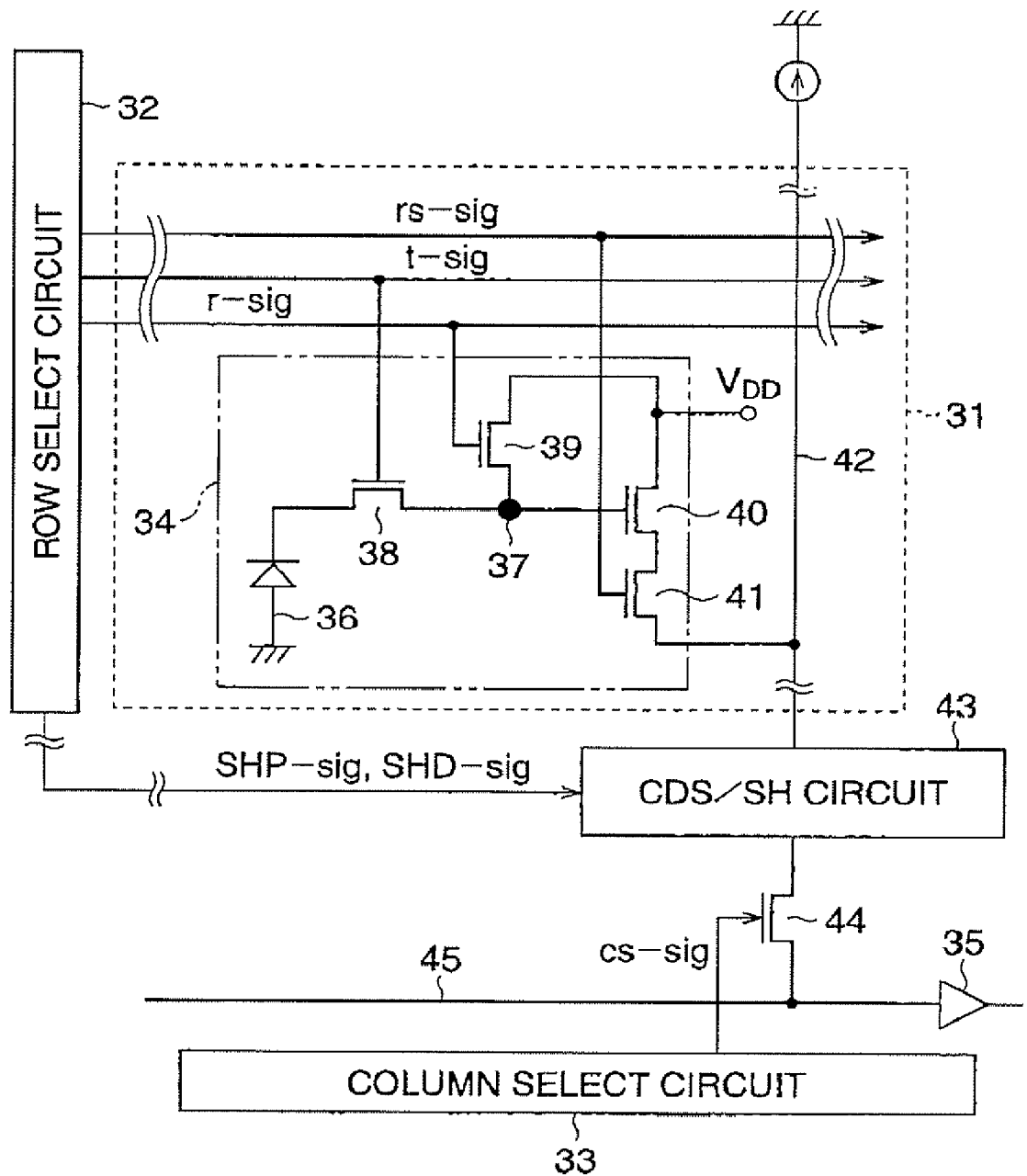
FIG. 3 illustrates a circuit structure of the pixel.

The structure of the imaging device 30 is explained using FIGS. 2 and 3.

The imaging device 30 is a CMOS image sensor. The imaging device 30 comprises an imaging block 31, a row select circuit 32, a column select circuit 33, and other components.

The imaging block 31 has a light receiving surface. A plurality of pixels 34 are arranged on the light receiving surface in a matrix (see FIG. 2). Each pixel 34 receives light, and generates a pixel signal according to the amount of received light. Pixel signals, generated by all pixels 34 forming the light receiving surface, are output in order from an output block 35. The image signal is formed by a plurality of pixel signals generated by a plurality of pixels.

As shown in FIG. 3, a photodiode (PD) 36, a floating diffusion (FD) 37, a transmit transistor 38, a reset transistor 39, an amplifier transistor 40, and a row select transistor 41 are mounted in the pixel 34.

The PD 36 generates a signal charge according to an amount of received light. The signal charge generated by the PD is received by the PD 37. The FD 37 converts the signal charge to a signal voltage. The signal voltage is output from the amplifier transistor 40 as a pixel signal.

When a transmit command signal, hereinafter referred to as a t-sig, is input to the gate of the transmit transistor 3B, said transmit transistor 38 transmits the signal charge from the PD 36 to the FD 37. When a reset command signal, hereinafter referred to as an r-sig, is input to the gate of the reset transistor 39, said reset transistor 39 resets the signal charge at the FD 37. By the resetting of the signal charge, the pixel signal is also reset and cleared. When a row select command signal, hereinafter referred to as an rs-sig, is input to the gate of the row select transistor 41, said row select transistor 41 enables the pixel signal to be output from the amplifier transistor 40 to the vertical output line 42. The t-sig, the r-sig, and the rs-sig are output front the row select circuit 32 at pre determined timings.

The vertical output lines 42 are wired for each column of the pixels 34. The pixel signal is output from each pixel 34 to the vertical output line 42 for which the column is the same as that of the pixel 34. All vertical output lines 42 are connected to a horizontal output line 45 via correlated double sampling/sampling and hold (CDS/SH) circuits 43 and column select transistors 44. The horizontal output line 45 is connected to the output block 35.

The CDS/SH circuit 43 performs a correlated double sampling/sampling and holding of a pixel signal. Namely, when a pre-hold command signal, hereinafter referred to as an SHP-sig, and a data hold command signal, hereinafter referred to as an SHD-sig, are input to the CDS/SH circuit 43, the CDS/SH circuit 43 samples the pixel signals output to the vertical output line 42, respectively. Then, the CDS/SH circuit 43 generates and holds the difference of the pixel signals.

When a column select command signal, hereinafter referred to as a cs-sig, is input to the gate of the column select transistor 44, the column select transistor 44 causes the pixel signal held by the CDS/SH circuit 43 to be output to the horizontal output line 45. The pixel signal sent to the horizontal output line 45 is output to the outside of the imaging device 30 via the output block 35. The cs-sig is output from the column select circuit 33 at predetermined timings.

As described above, a pixel signal is generated at each pixel 34 by outputting the t-sig, the r-sig, the rs-sig, the SHP-sig, the SHD-sig, and the cs-sig at predetermined timings. In addition, a pixel signal is transmitted from each pixel 34 to the output block 35 by outputting the rs-sig and the cs-sig at predetermined timings.

The timings to output the above command signals are controlled based on the imaging device drive signal output from the timing controller 17 to the row and the column select circuits 32, 33. Accordingly, the row and the column select circuits 32, 33, in cooperation with the timing controller 17, generate and output the above command signals, which are the t-sig, the r-sig, the rs-sig, the SHP-sig, the SHD-sig, and the cs-sig, to generate and to transmit pixel signals.

The operation of the imaging device 30, for example, an output of pixel signals from all pixels or an output of pixel signals from a part of the pixels, can be changed. A change command signal to change the operation of the imaging device 30 is generated and output from the timing controller 17.

The pixel signal generated by the imaging device 30 in converted to a digital signal by an A/D converter 20 (see FIG. 1). As described above, the image signal converted to a digital signal is stored by the DRAM 12. The stored image signal is read by the DSP 11. The DSP 11 carries out the predetermined signal processes for the read image signal.

A memory controller 21 controls operations for storing the image signal to the DRAM 12 and for outputting the stored image signal to the DSP 11. In addition, the memory controller 21 controls an operation for a refresh of the DRAM 12.

The imaging device drive signal is output to the memory controller 21 as well as to the row and the column select circuits 32, 33. The memory controller 21 causes the DRAM 12 to refresh while the imaging device drive signal is not output from the timing controller 17. Namely, the memory controller 21 carries out a refresh of the DRAM 12 between two consecutive imaging device drive signals.

Figure 4:
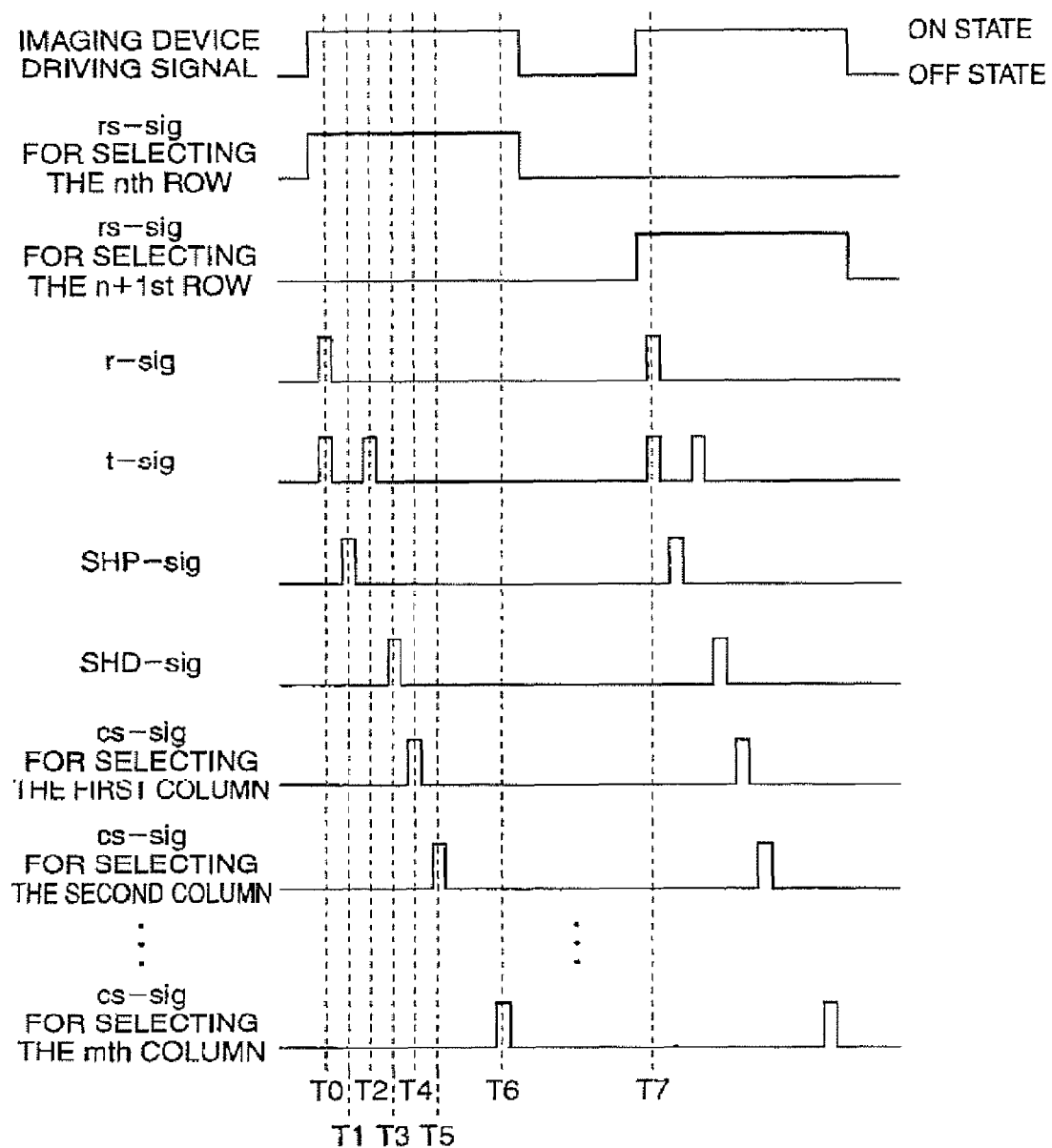
FIG. 4 is a timing-chart of some operations of the imaging device.

The timing of predetermined operations of the imaging device is described below with reference to FIG. 4. FIG. 4 is a timing-chart of some operations of the imaging device.

At time T0, the imaging signal is input to the row and the column select circuits 32, 33. Then, the rs-sig for selecting the nth row, the r-sig, and the t-sig is output from the row select circuit 32 to the imaging block 31. By outputting the rs-sig for selecting the nth row, all pixel signals, generated by all pixels arranged in the nth row, are enabled to be output. By outputting the r-sig and the t-sig at the same time, the signal charge stored by the PD 36 and the FD 37 is reset, and then the electrical potential of the FD 37 is reset to a standard electrical potential.

At time T1, the SHP-sig is output from the row select circuit 32 to the CDS/SE circuit 43. By outputting the SHP-sig, all pixel signals, generated by all pixels 34 arranged in the nth row, are sampled by the CDS/SH circuits 43 mounted for all columns. The pixel signals sampled at this time are the pixel signals corresponding to a reset noise not including a signal charge.

At time T2, the t-sig is output from the row select circuit 32 to the imaging block 31. By outputting the t-sig, the signal charge generated and stored by the PD 36 is transmitted to the FD 37.

At time T3, the SHD-sig is output from the row select circuit 32 to the CDS/SH circuit 43. By outputting the SHD-sig, all pixel signals, generated by all pixels 34 arranged in the nth row, are sampled by the CDS/SH circuits 43 mounted for all columns. The pixel signals sampled at this time are the pixel signals corresponding to a signal charge, which accord to an amount of received light, in addition to the reset noise.

At time T4, the cs-sig for selecting the first column is output from the column select circuit 33 to the column select transistor 44 of the first column. By outputting the cs-sig for selecting the first column, the pixel signal, carried out by the CDS/SH process in the CDS/SH circuit 43 of the first column, is output to the A/D converter 20 through the horizontal output line 45 and the output block 35.

At time T5, the cs-sig for selecting the second column is output from the column select circuit 33 to the column select transistor 44 of the second column. By outputting the cs-sig for selecting the second column, the pixel signal, carried out by the CDS/SH process in the CDS/SH circuit 43 of the second column, is output to the A/D converter 20 through the horizontal output line 45 and the output block 35.

After time T5, the pixel signal, carried out by the CDS/SH process in the CDS/SH circuit 43 of the other columns, is output in the same way as in the first and the second columns.

At time T6, the pixel signal of the mth column, which is the final column, is output. The length of the on state of the imaging device drive signal is predetermined, so that the imaging device drive circuit turns off after outputting the pixel signal of the mth column.

At time T7, the outputting of the pixel signal generated by the pixels 34 arranged in the n+1st row in the same way as time T0 starts. After time T7, the pixel signals generated by all pixels 34 in the imaging block 31 are output in the same way as in the above.

As described above, while the on state of the imaging device drive signal is input to the imaging device 30, the pixel signals are generated and consecutively output from the pixels 34 arranged in a single row.

Figure 5:
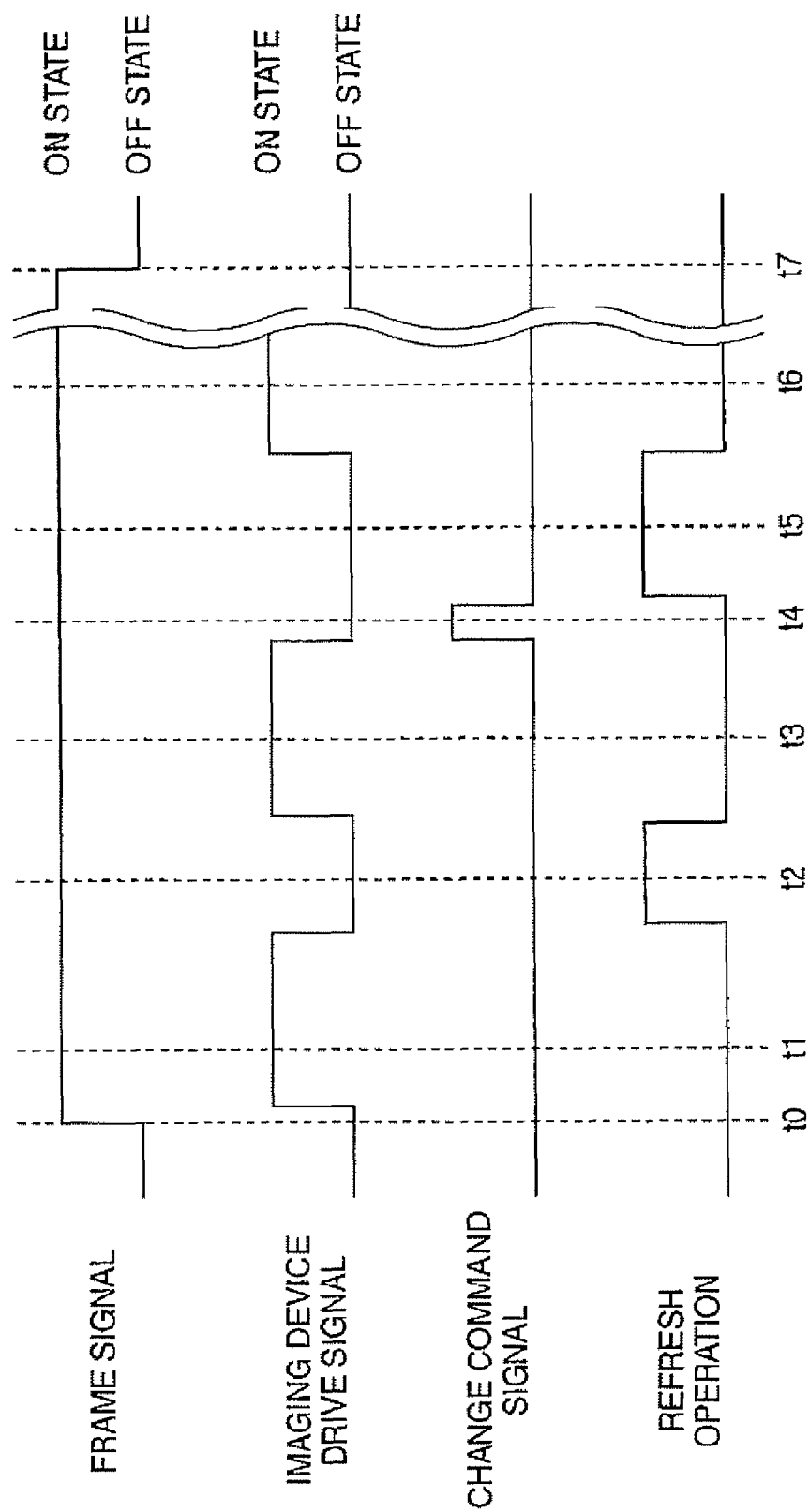
FIG. 5 is a timing-chart of the refresh operation.

Next, the timing of an operation for refresh of the DRAM 12 is described below with reference to FIG. 5. FIG. 5 is a timing-chart of the refresh operation.

The DSP receives a frame signal from the timing controller 17. The frame signal delimits the pixel signals forming one frame of an image signal. The pixel signals, input to the DSP 11 through the A/D converter during a single on state of the frame signal, are recognized by the DSP 11 as a pixel signal forming one image signal. The on and off state of the imaging device drive signal is switched (see t1, t3, and t6) so that all pixel signals generated by all pixels 34 can be output during the on state of the frame signal (see t0~t7).

The refresh operation is carried out between two consecutive on states of the imaging device drive signal (see t2). In addition, the refresh option is not carried out during the outputting of the change command signal to the imaging device 30 (see t4), and the refresh operation is carried out after outputting the change command signal (see t5).

Figure 6:
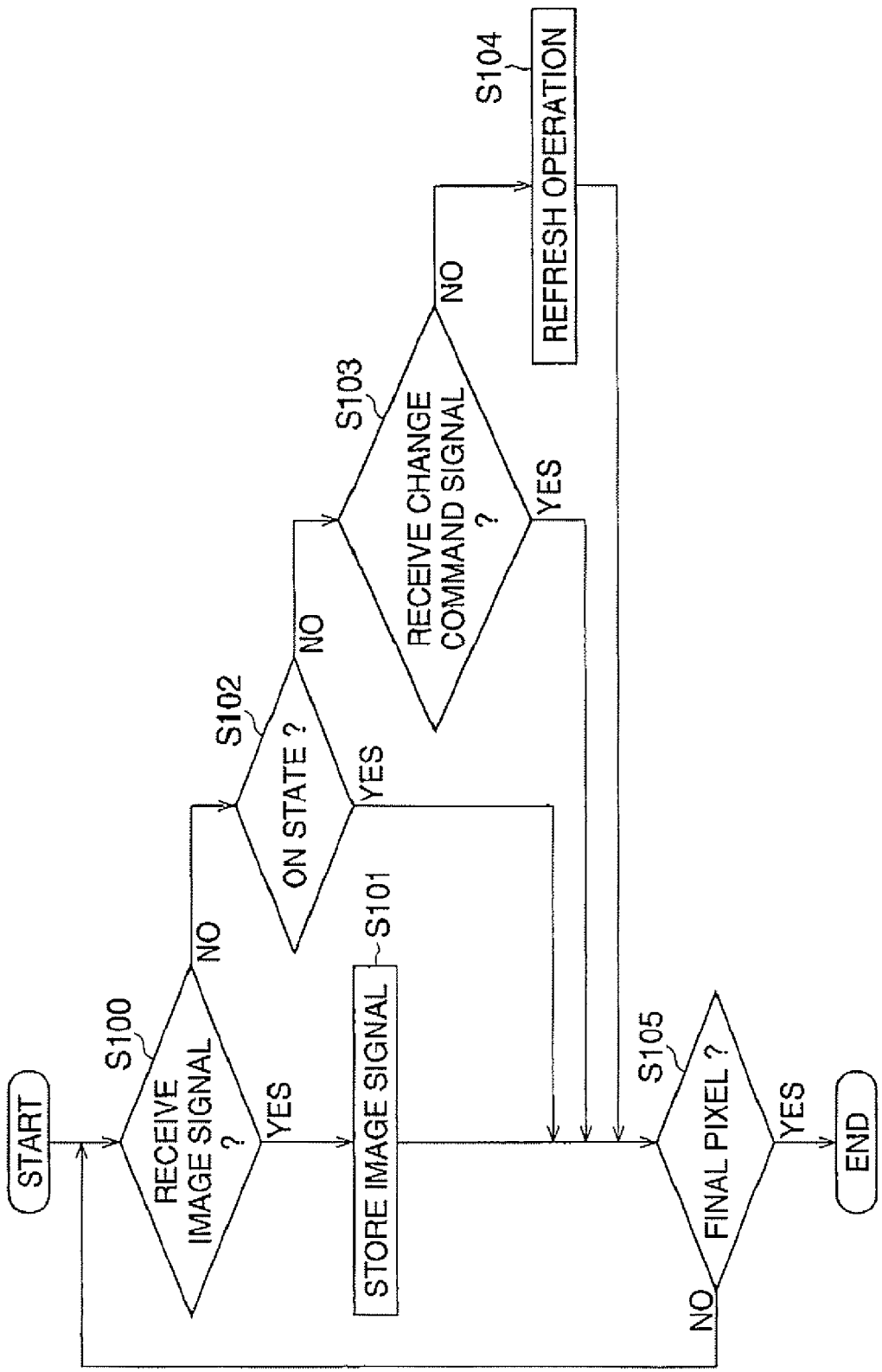
FIG. 6 is a flowchart of some processes for the refresh operation carried out by the memory controller.

Next, the refresh operation carried out by the memory controller 21 while one frame of the image signal is generated is explained below with reference to FIG. 6. FIG. 6 is a flowchart of some processes for the refresh operation carried out by the memory controller 21.

When one frame of an image signal starts to be read by the DSP 11, some processes of the refresh operation start.

At step S100, it is determined whether the DRAM 12 receives the image signal from the DSP 11. If the DRAM 12 receives the image signal, the process goes to step S101, and the memory controller 21 stores the image signal in the DRAM 12. After storing, the process goes to step S105, as described later.

If the DRAM 12 does not receive the image signal, the process goes to step S102. At step S102, it is determined whether the memory controller 21 receives the on state of the imaging device drive signal. If the imaging device drive signal received by the memory controller 21 is the on state, the process goes to step S105, as described later.

If the imaging device drive signal received by the memory controller 21 is not the on state, the process goes to step S103. At step S103, it is determined whether the memory controller 21 receives the change command signal. If the memory controller 21 receives the change command signal, the process goes to step S105, as described later.

If the memory controller 21 does not receive the change command signal, the process goes to step S104. At step S104, the memory controller 21 carries out the refresh operation for the DRAM 12. After the refresh operation, the process goes to step S105.

At step S105, it is determined whether the pixel signal of the final row and final column, forming one frame image signal, is output from the imaging device 30. If the final pixel signal is not output, the process returns to step S100, and the steps S100~S105 are repeated until the final pixel signal is output.

At step S105, if the final pixel signal is output, the refresh operation carried out by the memory controller 21 while generating one frame of the image signal finishes.

In the above embodiment, it is possible to drive the DRAM 12, which is a digital circuit, during a different period when the pixel signal, which is an analog signal, is generated and transmitted. Consequently, noise generated by driving the DRAM 12 can be prevented from mixing with the pixel signal and the image signal.

The imaging device 30 is a CMOS image sensor in the above embodiment. However, the present invention may have any kind of image sensor, such as a CCD image sensor. In the case of the CCD image sensor, the refresh operation of the DRAM 12 should be carried out during a different period, when a vertical and a horizontal CCD transmit the signal charge, a CDS/SH circuit carries out the CDS/SH, and an FD is reset.

The DRAM 12 is the digital circuit that may make noise mix with an image signal in the above embodiment. However, the digital circuit that must be driven during generation of an image signal and of which the driving timing can be controlled is adaptable.

The present invention is adapted to the digital camera in the above embodiment. However, the present invention is adapted to the analog and digital circuit driver that is connected to both an analog and a digital circuit, and drives both the analog and the digital circuit.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2005-213878 (filed on Jul. 25, 2005), which is expressly incorporated herein, by reference, in its entirety.

The invention claimed is:

1. A driver which controls an analog signal generator that generates analog signals and a digital circuit where noise is generated while carrying out a first operation, comprising:
an analog signal generator driving block that outputs driving signals to said analog signal generator, said driving signals causing said analog signal generator to generate said analog signals; and
a digital circuit driving block that causes said digital circuit to carry out said first operation between two of said driving signals, consecutively output from said analog signal generator driving block at different timings.

2. The driver according to claim 1, wherein said analog signal generator is an imaging device that generates analog image signals based on said driving signals.

3. The driver according to claim 2, wherein said driving signals comprise at least one of a transmit command signal that causes a pixel signal, generated according to an amount of received light by a pixel on a light receiving surface of said imaging device, to be transmitted from said pixel to an output terminal of said imaging device; a reset command signal that causes said pixel signal stored by said pixel to be reset; a sampling and holding command signal that causes said pixel signal to be carried out by a correlated double sampling/sampling and holding; and a change command signal that causes an operation of said imaging device to change.

4. The driver according to claim 2, wherein said digital circuit is a DRAM that stores digital signals resulting from A/D conversion of said analog image signals by an A/D converter, and said first operation is a refresh operation of said DRAM.

5. The driver according to claim 4, wherein said digital circuit driving block carries out said refresh operation of said DRAM based on a driving signal.

6. An imaging apparatus comprising:
an imaging device that generates analog image signals;
a timing control block that generates driving signals that cause said imaging device to generate said analog image signals, and that outputs said driving signals to said imaging device at different timings;
an A/D converter that converts said analog image signals to digital signals;
a DRAM that stores said digital signals; and
a memory controller that carries out a refresh operation of said DRAM between two of said driving signals, consecutively output from said timing control block at different timings.

* * * * *